May 26, 1942.  A. E. GESSLER ET AL  2,284,277
QUICK DRYING INTAGLIO MARKING COMPOSITION
Filed June 22, 1939
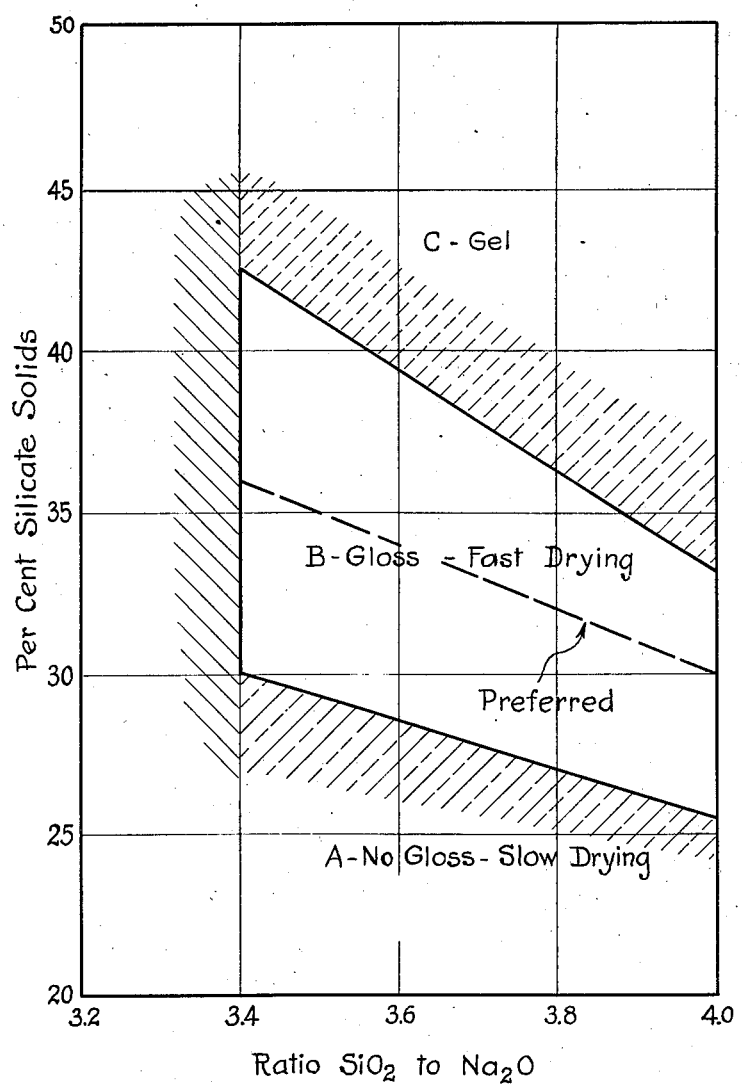
INVENTORS
ALBERT E. GESSLER,
DAVID M. GANS AND PAUL W. GREUBEL
BY Milton Zucker
ATTORNEYS.

Patented May 26, 1942

2,284,277

UNITED STATES PATENT OFFICE 2,284,277

QUICK DRYING INTAGLIO MARKING COMPOSITION

Albert E. Gessler and David M. Gans, New York, and Paul W. Greubel, Long Island City, N. Y., assignors to Interchemical Corporation, New York, N. Y., a corporation of Ohio Application June 22, 1939, Serial No. 280,564

4 Claims. (Cl. 106—20)

This invention relates to quick drying intaglio marking compositions designed for application by intaglio plates, and has particular reference to intaglio printing inks specially designed for producing water-resistant inks of high finish at minimum cost. Specifically, this invention relates to intaglio inks made from water soluble alkali silicates, formulated in such manner as to overcome the conventional objections to alkali silicates as vehicles for such compositions.

Alkali silicates are cheap, and have been suggested heretofore as vehicles for printing inks and coating compositions. They have never come into use for a variety of reasons. Their tendency to dry rather slowly, particularly in damp weather, has been objectionable. A second objection has been the lack of finish obtainable; when sufficient pigment is added to ordinary silicates at conventional intaglio ink viscosity to produce a print which will cover the paper in customary film thicknesses (5 to 20 microns) a dull water color finish is often obtained, instead of a desirable full or semi-gloss. A third objection has been the water solubility of the prints produced.

We have discovered that these objections to conventional prior art printing inks can be overcome, by using as the vehicle of the ink an aqueous solution of an alkali silicate in which the ratio of $SiO_2$ to alkali oxide is 3.4 to 1.0 or higher, provided that the silicate content of the ink is 12% or less of the content at which gelation occurs. We prefer to maintain the volume ratio of pigment to silicate at or below 12 c. c. of pigment per 100 grams of silicate.

Silicates having a silicate alkali oxide ratio of 3.4 to 1.0 or higher dry to films which are sufficiently water resistant for most purposes but when used in conventional manner, do not yield glossy or fast drying films. We have discovered that gloss and rapid drying can both be obtained with this type of silicate if the water content of inks made therefrom is maintained very close to the point at which gelation of the ink occurs.

The chart in the accompanying drawing shows the relationship between silicate content, and film properties on uncoated paper, with unpigmented sodium silicate solutions which yield water-resistant films, in the range of from 3.4 to 1.0 to 3.9 to 1.0 silica/alkali oxide ratio.

As can be observed from the drawing, the water content of silicate inks must be carefully controlled in order to get desirable films on uncoated paper; with the 3.4 to 1.0 silica-sodium oxide material, the solution must contain 30 to 31% silicate, if good dry and gloss are to be obtained, while the material gels at 42 to 43% silicate, giving a range of only 12% in solid content. This range narrows to about 8% at the 3.9 ratio (about 26 to 34%) and is even narrower in higher ranges.

We believe these unusual results are due to the rather peculiar relationship between solid content and viscosity existing in these inks. As the percentage of silicate increases in a water solution of one of these silicates, the viscosity goes up sharply until a point is reached at which the curve breaks rather sharply, and viscosity increases so rapidly thereafter with increasing silicate percentage that gelation occurs with a rather small increase of silicate. We have found that when such silicates are applied to uncoated paper, the paper appears to absorb the water faster than it does the silicate; by maintaining the content close to the gel point, sufficient water is absorbed immediately so that the silicate rapidly forms a gel film on top of the paper, thus obtaining both gloss and rapid dry.

The position of the gel point varies with any composition, depending on the presence of bodying agents such as pigments and butanol, and of thinning agents such as glucose. In general, however, pigmented materials follow the clear vehicles from which they are made, although the gel point is generally one or two percent lower.

In order to insure maximum gloss, the smallest possible ratios of pigment to silicate solution should be used, consonant with proper hiding. Fortunately, the prevention of absorption of the film by its gelation permits full use to be made of the pigment. We prefer to maintain our pigment at or below 12 c. c. volume per 100 grams of dry silicate, for gloss prints; more pigment may be added if a semi-gloss finish is desired.

Sodium silicate having a ratio of 3.4 $SiO_2$ to 1.0 $Na_2O$ gels at between 42 and 43% of silicate, while gloss is lost if the vehicle is printed on paper below about 30 to 31% silicate content. Sodium silicate having a 3.9 to 1.0 silica to alkali ratio produces a gel point at about 34% solids, and loss of gloss at about 26% solids, while a potassium silicate of 3.9 ratio gives a gel at about 30% silicate solids and loss of gloss at about 24% silicate solids.

Because of the reduction in the amount of solid material necessary to produce acceptable prints, and because of the greater factor of safety as regards water sensitivity, we prefer to use silicates having a silica to alkali ratio of 3.9 to 1.0 or more. With such silicates, it is necessary to maintain the silicate solids of the ink within 8% of the silicate content of the gel point; in preferred practice, we operate within 4% of the gel point.

In cases where the silicate inks are pigmented with dark colors, and the prints are maintained in storage over prolonged periods of time, potassium silicate is preferable to the cheaper sodium silicate, since the formation of sodium carbonate tends to cause the appearance of a whitish efflorescence on the ink film.

Pigments for these inks must be chosen with care, since it is desirable that they have relatively high covering power, combined with resistance to alkali. Cadmium lithopone, lithol toner, carbon black, ultramarine blue, toluidine toner, titanium dioxide and similar pigments may all be used.

Typical examples of inks made in accordance with our invention are the following:

*Example 1*

| | Parts by weight |
|---|---|
| Carbon black | 3.0 |
| Sodium silicate solution, containing 31% silicate with a silicate/alkali oxide ratio of 8.9 to 1.0 | 97.0 |

The pigment is mixed with the silicate, and passed through a colloid mill.

*Example 2*

| | Parts by weight |
|---|---|
| Toluidine toner | 4.0 |
| Potassium silicate containing 27% silicate, of silicate/alkali oxide ratio of 3.9 to 1.0 | 96.0 |

Made as Example 1.

Other combinations can, of course, be used, without departing from the scope of the invention, which is defined in the claims. The compositions may be applied by intaglio process, both to produce designs, and for overall coatings.

We claim:

1. A quick drying intaglio marking composition adapted to produce high gloss prints, comprising a dispersion of pigment in an alkali silicate solution, the alkali silicate containing from 3.4 to about 3.9 mols of silica per mol of alkali oxide, and the solids content of the silicate ranging from between 30 and 42% for the 3.4 to 1 silica/alkali ratio to between 24 and 34% for the 3.9 to 1 silica/alkali ratio.

2. A quick drying intaglio marking composition adapted to produce high gloss prints, comprising a dispersion of pigment in a sodium silicate solution, the sodium silicate containing from 3.4 to about 3.9 mols of sodium per mol of alkali oxide, and the solids content of silicate ranging from about 36% for the 3.4 to 1 silica/sodium oxide ratio to about 30% for the 3.9 to 1 silica/sodium oxide ratio.

3. A quick drying intaglio marking composition adapted to produce high gloss prints comprising a dispersion of color in a sodium silicate solution containing from 26 to 34% of sodium silicate having a $SiO_2$-$Na_2O$ ratio of about 3.9 to 1.0.

4. A quick drying intaglio marking composition adapted to produce high gloss prints comprising a dispersion of color in a potassium silicate solution containing from 24 to 30% potassium silicate having a $SiO_2$-$K_2O$ ratio of about 3.9 to 1.0.

ALBERT E. GESSLER.
DAVID M. GANS.
PAUL W. GREUBEL.

CERTIFICATE OF CORRECTION.

Patent No. 2,284,277.　　　　　　　　　　　　May 26, 1942.

ALBERT E. GESSLER, ET AL.

It is hereby certified that error appears in the printed specification of the above numbered patent requiring correction as follows: Page 2, first column, line 26, Example 1, for "8.9" read --3.9--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.